United States Patent [19]

Inagami

[11] Patent Number: 4,884,294

[45] Date of Patent: Nov. 28, 1989

[54] PORTABLE CORDLESS TELEPHONE SET FOR OUTPUTTING VARIOUS DISCRIMINIATION SOUNDS WITH SIMPLE CIRCUIT CONSTRUCTION

[75] Inventor: Fujio Inagami, Yokohama, Japan

[73] Assignee: Fujitsu Limited, Kawasaki, Japan

[21] Appl. No.: 160,765

[22] Filed: Feb. 26, 1988

[30] Foreign Application Priority Data

Feb. 27, 1987 [JP] Japan ................... 62-043064

[51] Int. Cl.$^4$ ............................. H03B 19/00
[52] U.S. Cl. ..................... 379/61; 340/384 E
[58] Field of Search ............. 379/61, 62, 63; 340/584 E

[56] References Cited

U.S. PATENT DOCUMENTS

| | | | |
|---|---|---|---|
| 4,138,595 | 2/1979 | Barkwith | 379/61 |
| 4,421,952 | 12/1983 | Barnes | 379/58 |
| 4,437,088 | 3/1984 | Ferguson | 340/384 E |
| 4,482,888 | 11/1984 | Todaka et al. | 340/384 E |
| 4,488,145 | 12/1984 | Katsuma | 340/384 E |
| 4,650,931 | 3/1987 | Tsukada et al. | 379/61 |
| 4,700,180 | 10/1987 | Vance | 340/573 |
| 4,737,981 | 4/1988 | Hoberman et al. | 379/112 |

*Primary Examiner*—Robert Lev
*Attorney, Agent, or Firm*—Staas & Halsey

[57] ABSTRACT

A portable cordless telephone set for outputting various types of discrimination sounds, in radio communication with a base unit, and having a telephone transmission and reception portion. The portable cordless telephone set includes a sound generation control circuit having at least one microcomputer and receiving a discrimination sound request from the telephone transmission and reception portion; a clock generation circuit generating an operation clock of the sound generation control circuit; a sound generator generating sound having different sound pressures in response to different resonant frequencies, one of the resonant frequencies being adjacent to a frequency of the operation clock; a frequency divider circuit providing at least one divided frequency signal; a switch circuit selectively outputting a signal from the clock generation circuit and the frequency divider circuit; and a timing control circuit outputting an ON/OFF timing signal of the frequency signal received from the switch circuit to the sound generator. The sound generation control circuit energizes the switch circuit and sends a command to the timing control circuit in response to the received discrimination sound request.

10 Claims, 7 Drawing Sheets

PORTABLE CORDLESS TELEPHONE SET FOR OUTPUTTING VARIOUS DISCRIMINIATION SOUNDS WITH SIMPLE CIRCUIT CONSTRUCTION

BACKGROUND OF THE INVENTION

1. Field of the Invention

The present invention relates to a portable cordless telephone set in radio-communication with a base telephone unit. More particularly, it relates to a portable cordless telephone set for outputting a variety of discrimination sounds by a simple circuit construction.

2. Description of the Related Art

Portable cordless telephone sets are extensively used because they are connected by radio-communication to base telephone units fixed at certain positions and connected to a telephone exchange; namely, the telephones are not subject to distance limitations imposed by conventional telephone cords and thus are very convenient. A typical portable cordless telephone set incorporates a circuit for generating various discrimination sound and for example, a paging sound, an alarm sound, in addition to a speaker and a microphone. These various discrimination sounds are produced by a combination of a change of sound volumes and a change of ON/OFF patterns.

Prior art portable cordless telephone sets suffer from disadvantages of relative bulkiness, higher costs, and higher power consumption. These disadvantages will be described hereinafter in more detail with reference to the drawings.

SUMMARY OF THE INVENTION

An object of the present invention is to provide a portable cordless telephone set which outputs a variety of discrimination sounds, has a simple circuit construction, a low cost, and a low power consumption.

According to the present invention, there is provided a portable cordless telephone set for outputting various types of discrimination sounds, in radio communication with a base unit, and having telephone transmission and reception portions. The portable cordless telephone set includes a sound generation control circuit connected to the telephone transmission and reception portion to receive a discrimination sound request and having at least one microcomputer; a clock generation circuit generating an operation clock of the sound generation control circuit; a sound generator generating sounds having different sound pressures in respone to different resonant frequencies supplied thereto, one of the resonant frequencies being near a frequency of the operation clock of the sound generation control circuit output from the clock generation circuit; a frequency divider circuit connected to the clock generation circuit to receive the clock and having at least one frequency divider providing a divided frequency signal; a switch circuit connected to the clock generation circuit and the frequency divider circuit to selectively output one frequency signal therefrom; and a timing control circuit connected between the switch circuit and the sound generator, receiving the frequency signal from the switch circuit, and outputting an ON/OFF timing signal of the received frequency signal to the sound generator in response to a command from the sound generation control circuit. The sound generation control circuit energizes the switch circuit and sends the command to the timing control circuit in response to the received discrimination sound request.

The sound generator may have at least two different resonant frequencies, the relationship of the resonant frequencies being approximately 1:n, wherein n is an integer, and outputs sounds having different sound levels in response to the resonant frequencies.

The frequency divider circuit may include a frequency divider having a 1/n dividing function. Also, the switch circuit may include a switch connected to the clock generation circuit and the frequency divider.

Here, n is approximately two, and the frequency divider in the frequency divider circuit may be formed by a delay type flip-flop.

The sound generator may have at least three different resonant frequencies, the relationship of the resonant frequencies being approximately 1:n:2n, wherein n is an integer, and outputs sounds having different sound levels in response to the resonant frequencies.

The frequency divider circuit may include two series-connected frequency dividers, each having a 1/n dividing function. The first frequency divider is connected to the clock generation circuit. The switch circuit includes two parallel switches; a first switch connected to the clock generation circuit and the first frequency divider, and a second switch connected to a second frequency divider. Here, n is approximately two, and each of the frequency dividers may be formed by a delay type flip-flop.

The sound generator may comprise a magnetic sound generator or a piezoelectronic device.

An amplifier may be provided between the timing control circuit and the sound generator, to amplify the signal from the timing control circuit to a level at which the sound generator can be driven.

BRIEF DESCRIPTION OF THE DRAWINGS

Other objects and features of the present invention will be described below in detail with reference to the accompanying drawings, in which.

DETAILED DESCRIPTION OF THE PREFERRED EMBODIMENTS

Before describing the preferred embodiments of the present invention, an example of a prior art discrimination sound generation circuit installed in a portable cordless telephone set is described with reference to FIG. 1.

Figure 1:
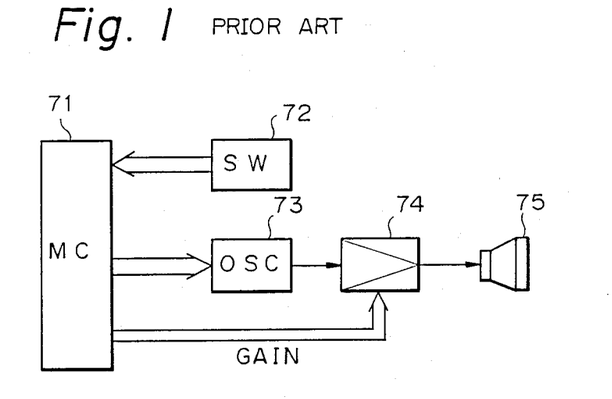
FIG. 1 is a circuit diagram of a prior art discrimination sound generation circuit in a portable cordless telephone set.

In FIG. 1, reference numeral 71 denotes a controller (MC) consisting of two four-bit one chip microcomputers and controlling the generation of discrimination sounds, 72 denotes a volume setting switch (SW), 73 denotes an oscillator (OSC), 74 denotes an amplifier, and 75 denotes an alarm sound generator. A speaker and microphone are not shown.

The controller 71 detects a status of the portable cordless telephone set, triggers the oscillator 73, and gives a gain to the amplifier 74 in response to a value set at the volume setting switch 72, to change a volume of the sound from the alarm sound generator 75.

The above discrimination sound generation circuit has the advantage of being able to freely set the sound volume from the sound generator in accordance with the number of switches in the volume setting switch 72, and to freely select an oscillation frequency by independently providing a plurality of oscillators.

Space in the portable cordless telephone set is, of course, limited, but to provide a better discrimination sound function and to increase the discrimination sounds while increasing the functions, the provision of various discrimination sounds is required. This requires a complex circuit construction and a large space, and as a result, the size of the portable cordless telephone set must be increased, the power consumed by the portable cordless telephone set will be increased, and the cost of the portable cordless telephone set is also increased. Also, more concretely, the increase of the switches of the volume setting switch 72, the oscillators 73, and the amplifiers 74 necessitates the provision of many input and output ports for the four-bit microcomputers of the controller 71. However, the number for I/O ports of the four-bit microcomputers is limited, and the number of I/O ports usable for the above purpose is limited, and as a result, higher performance microcomputers, for example, eight-bit microcomputers, must be provided. This will result in higher costs, higher power consumption, and the need for more space, in addition to those required by the volume setting switch 72, the oscillators 73, and the amplifiers 74. The above defects must be eliminated to enable an extensive development of the portable cordless telephone set.

Now, a preferred embodiment of a portable cordless telephone set including a discrimination sound generation circuit of the present invention will be described.

Figure 2:
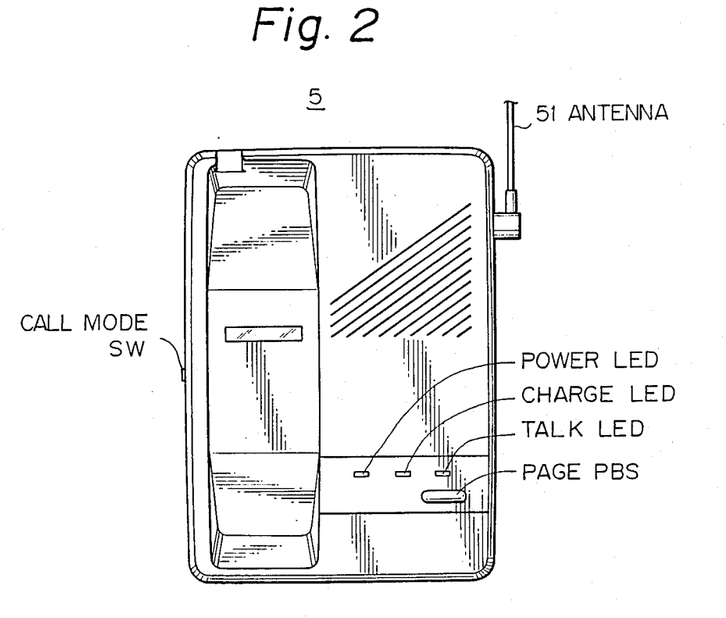
FIG. 2 is a front view of an embodiment of a base unit in accordance with the present invention.
Figure 3:
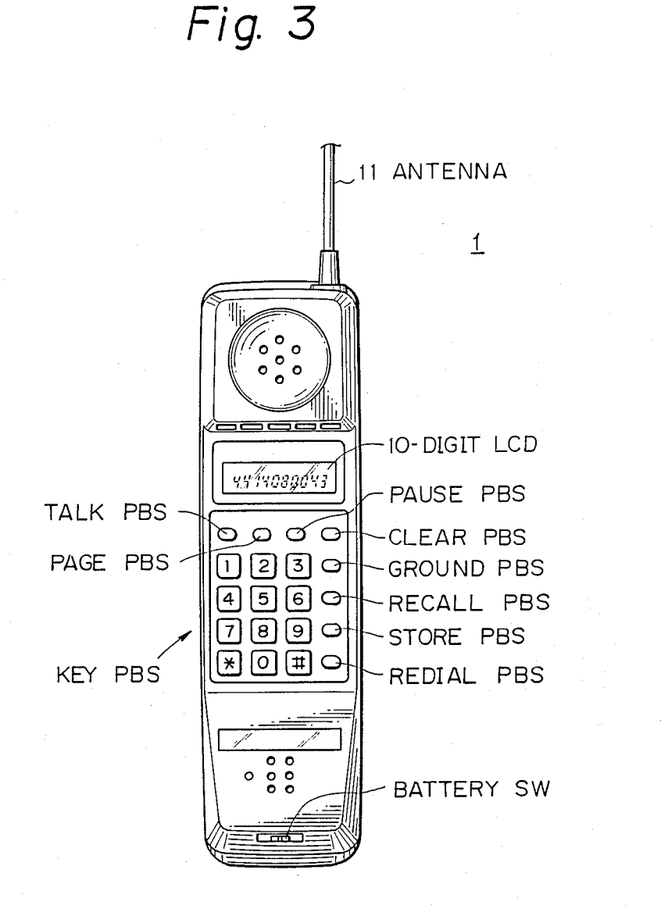
FIG. 3 is a front view of an embodiment of a portable cordless telephone set in accordance with the present invention.

FIGS. 2 and 3 show a base unit 5 and a portable cordless telephone set (or hand set) 1 has an embodiment of the present invention. The base unit 5 is fixed at a predetermined position and is connected to a telephone exchange (not shown). The hand set 1 can be separated from the base unit 5, and both are in radio communication through antennas 51 and 11.

In FIG. 2, the external indicators and operation switches have the following functions:

"CALL MODE SW (switch)": stops incoming or outgoing calls when switched ON.

"POWER LED (light emitting diode)": displays power status.

"CHARGE LED": displays power charge status.

"TALK LED": displays "talk" or "no-talk" status.

"PAGE PBS (push button switch)": used to page the person carrying the hand set or to transfer a call to the hand set.

In FIG. 3 the external indicators and operation switches are used to achieve the following functions:

"TALK PBS": used for beginning or ending a call.

"PAGE PBS": same function as that in the base unit.

"10-DIGIT LCD (liquid crystal display)": displays a telephone number, etc.

"PAUSE PBS": used for providing an interval between the digits being dialled.

"GROUND PBS": used for ground flashing the telephone line.

"RECALL PBS": used with "TALK PBS" for speed-dialling.

"STORE PBS": used for storing telephone numbers in a memory of the base unit.

"REDIAL PBS": used for redialling last telephone number called.

"KEY PBS": used for dialling, etc.

Figure 4:
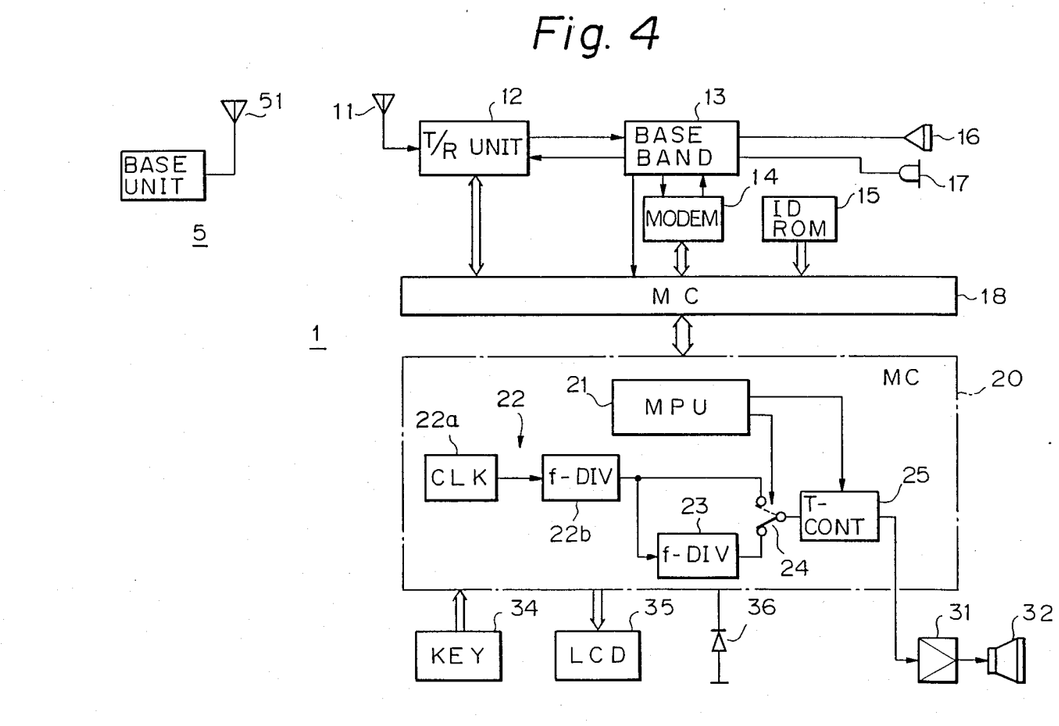
FIG. 4 is a circuit diagram of an embodiment of a discrimination sound generation circuit in accordance with the present invention and a relevant circuit, both accommodated in the portable cordless telephone set shown in FIG. 3.

The lower part of FIG. 4 shows a discrimination sound generation circuit and the upper part shows a transmission and reception circuit, both accommodated in the hand set 1 shown in FIG. 3.

The transmission and reception circuit includes a transmission and reception (T/R) unit 12 connected to the antenna 11, a base-band portion 13, a modulator and demodulator (MODEM) 14, an identification storage read-only-memory (ID ROM) 15, and a transmission and reception controller 18 consisting of two four-bit microcomputers. A speaker 16 and a microphone 17 are connected to the base-band portion 13 for normal telephone transmission and reception operations.

The discrimination sound generation circuit includes a sound controller 20, an amplifier 31, and a sound generator 32. These generate a variety of sounds. The key push button switches and other push button switches 34, the 10-digit LCD 35, and a back-light 36 for the LCD 35, as shown in FIG. 3 except for the back-light 36, are connected to the sound controller 20. The sound controller 20 consists of a micro-processor-unit portion 21 having two four-bit microprocessor units (MPUs), a clock generator (CLK) 22a, a first frequency divider (F-DIV) 22b, a second frequency divider (F-DIV) 23, a switch 24, and a timing controller (T-CONT) 25. The clock generator 22a is a serial-interface clock generator for the MPU portion 21 and the oscillation frequency is 4 MHz. The first frequency divider 22b receives the 4 MHz oscillation frequency signal and divides same to output a 2 kHz frequency signal. The clock generator 22a and the first frequency divider 22b thus form a standard frequency oscillator 22. The second frequency divider 23 receives the 2 kHz frequency signal from the first frequency divider 22b and divides same to output a 1 kHz frequency signal. Accordingly, the second frequency divider 23 can be formed by single delay-type flip-flop (D-FF).

Figure 5:
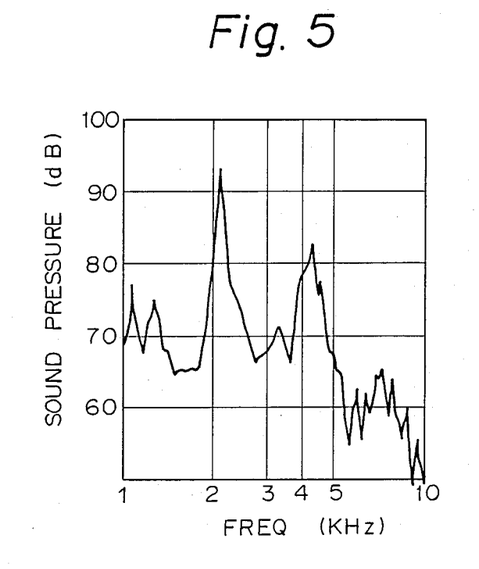
FIG. 5 is a graph representing a characteristic of a sound generator shown in FIG. 4.

The sound generator 32 is a magnetic sound generator, for example, a CB-12A made by CITIZEN ELECTRONIC CO., LTD. The magnetic sound generator 32 has the characteristics as shown in FIG. 5. In FIG. 5, the sound pressures are 70 dB at a resonant frequency of approximately 1 kHz, 85 dB at a resonant frequency of approximately 2 kHz, and 78 dB at a resonant frequency of approximately 4 kHZ. Accordingly, when the 1 kHz signal is supplied to the sound generator 32, the sound generator 32 generates a sound having a pressure of approximately 70 dB. When the 2 kHz signal is supplied to the sound generator 32, the sound generator 32 generates a sound having a pressure of approximately 85 dB. A voltage supplied to the sound generator 32 is 1.5 VDC. Note that the magnetic sound generator 32 has a fine frequency relationship of 1:2:4, which can be provided by simple frequency dividers, and generates different sound levels at those frequencies.

Figure 6A:
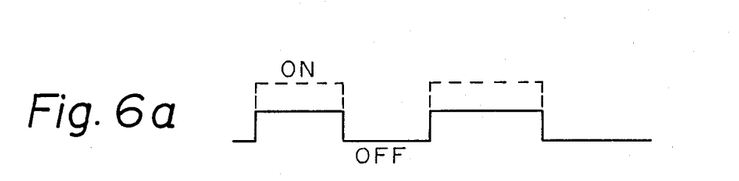
FIGS. 6a and 6b are general timing charts of discrimination sounds generated by the sound generator shown in FIG. 4.
Figure 6B:
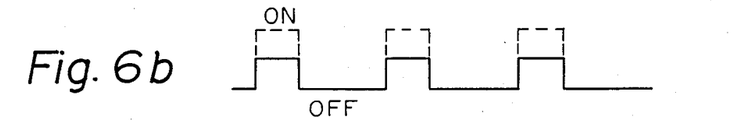

The transmission and reception controller 18 and the sound controller 20 are connected by a computer-computer interface. The sound controller 20 receives discrimination sound data from the base-band unit 13 through the transmission and reception controller 18. The MPU portion 21 of the sound controller 20 activates the switch 24 to form a connection between the second frequency divider 23 and the timing controller 25 in response to the received discrimination sound data. At the same time, the MPU portion 21 sends an ON/OFF pattern to the timing controller 25 in accordance with the received discrimination sound data. A 1 kHz signal having an ON/OFF pattern as shown in FIG. 6a is supplied to the amplifier 31 and amplified to a signal level at which the sound generator 32 is energized. As a result, the sound generator 32 generates a sound of approximately 70 dB and having a sound-ON and sound-OFF pattern corresponding to the ON/OFF pattern as shown by a solid line in FIG. 6a. If the MPU portion 21 deenergizes the switch 24, as shown by a dotted line in FIG. 4, the 2 kHz signal is supplied to the sound generator 32, resulting in the generation of a sound of approximately 92 dB and having a sound-ON and sound-OFF pattern corresponding to a dotted line in FIG. 6a. Conversely, when the MPU portion 21 receives other discrimination sound data, the sound generator 32 generates a sound of approximately 70 dB and having a sound-ON and sound-OFF pattern as shown by a solid line in FIG. 6b, or another sound of approximately 92 dB and having a sound-ON and sound-OFF pattern as shown by a dotted line in FIG. 6b.

Figure 7A:
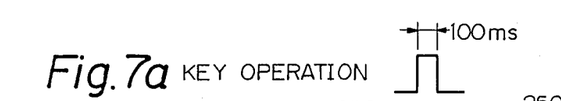
FIGS. 7a to 7h are specific timing charts of the discrimination sounds generated by the sound generator shown in FIG. 4.

More specific details of the sound generation will be given with reference to the following specific applications:

(1) Key operation acknowledge sound
a. Content
Operation acknowledge sound when the key push button switches shown in FIG. 3 are operated, for example, for dialling.
b. Sound level
Low because the user is holding the hand set 1. A 1 kHz signal is supplied to the sound generator 32.
c. Sound pattern
A single ON-sound for 100 ms as shown in FIG. 7a.

Figure 7B:
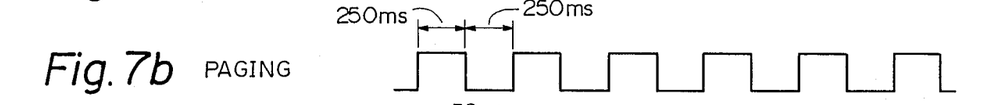

(2) Paging during talking
a. Content
Calling sound of a paging from the base unit 5 while the user is talking into the hand set 1.
b. Sound level: Low
c. Sound pattern
Periodical sound ON for 250 ms and OFF for 250 ms, as shown in FIG. 7b. The periodical sound can be terminated by pushing the TALK PBS or the PAGE PBS in the hand set 1, or by repushing the PAGE PBS at the base unit 5.

(3) Paging when not talking
a. Content
Calling sound of paging from the base unit 5 when the user is not talking.
b. Sound level
High because the user may be at a distance from the hand set 1.
c. Sound pattern
Periodical sound as shown in FIG. 7b, i.e., same as that of the "paging during talking".

Figure 7C:
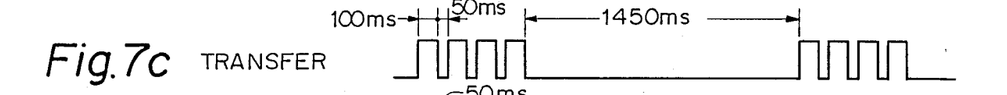

(4) Transfer from the hand set to the base unit
a. Content
The user pushes the "PAGE PBS" on the hand set 1 during talking by using the hand set 1 to transfer the call to the base unit 5.
b. Sound level: Low
c. Sound pattern
Semiperiodical sound as shown in FIG. 7c.

(5) Transfer from the base unit to the hand set
a. Content
The transfer of the call from the base unit 5 to the hand set 1.
b. Sound level: High
c. Sound pattern
Semiperiodical sound as shown in FIG. 7c, i.e., same as that of the transfer from the hand set to the base unit.

Figure 7D:
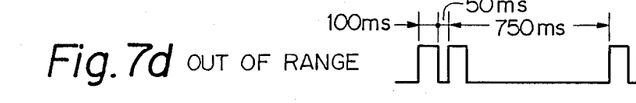

(6) Out-of-range
a. Content
Warning that the hand set 1 is leaving the radio communication range of the base unit 5 during talking using the hand set 1, by detecting a level of a received signal.
b. Sound level: Low
c. Sound pattern
Semiperiodical sound as shown in FIG. 7d.

Figure 7E:
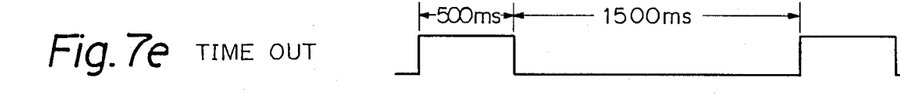

(7) Time out
a. Content
Warning that talk time has exceeded fifteen (15) minutes.
b. Sound level: Low
c. Sound pattern
Two pulse sound as shown in FIG. 7e.

Figures 7F, 7G:
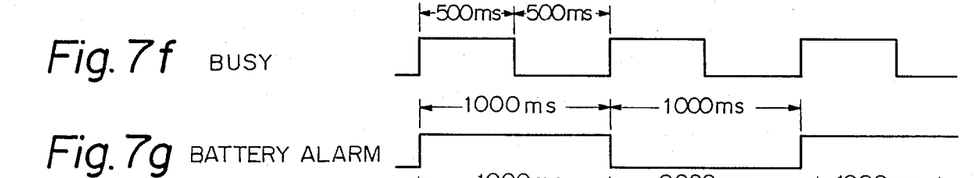

(8) Busy
a. Content
Warning that channels usable between the base unit 5 and a plurality of hand sets connected by radio to the base unit, for example, 40 channels, are all in use.
b. Sound level: Low
c. Sound pattern
Periodical sound as shown in FIG. 7f.

(9) Battery alarm during talking
a. Content
Warning that battery voltage of the hand set 1 is lower than a predetermined level during talking.
b. Sound level: Low
c. Sound pattern
Periodical sound as shown in FIG. 7g.

(10) Battery alarm when not talking
a. Content
Warning that battery voltage of the hand set 1 is lower than a predetermined level when not talking.
b. Sound level: High
c. Sound pattern
Periodical sound as shown in FIG. 7g, i.e., same as that of the battery alarm during talking.

Figure 7H:
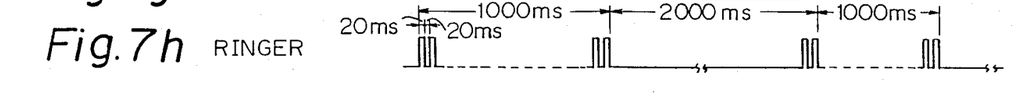

(11) Ringer
a. Content
Announcing a call.
b. Sound level: High
c. Sound pattern
Interrupted sound as shown in FIG. 7h.

As described above, the sound level is low when the user is holding the hand set 1, and high when the user is at a distance from the hand set 1.

Figure 8:
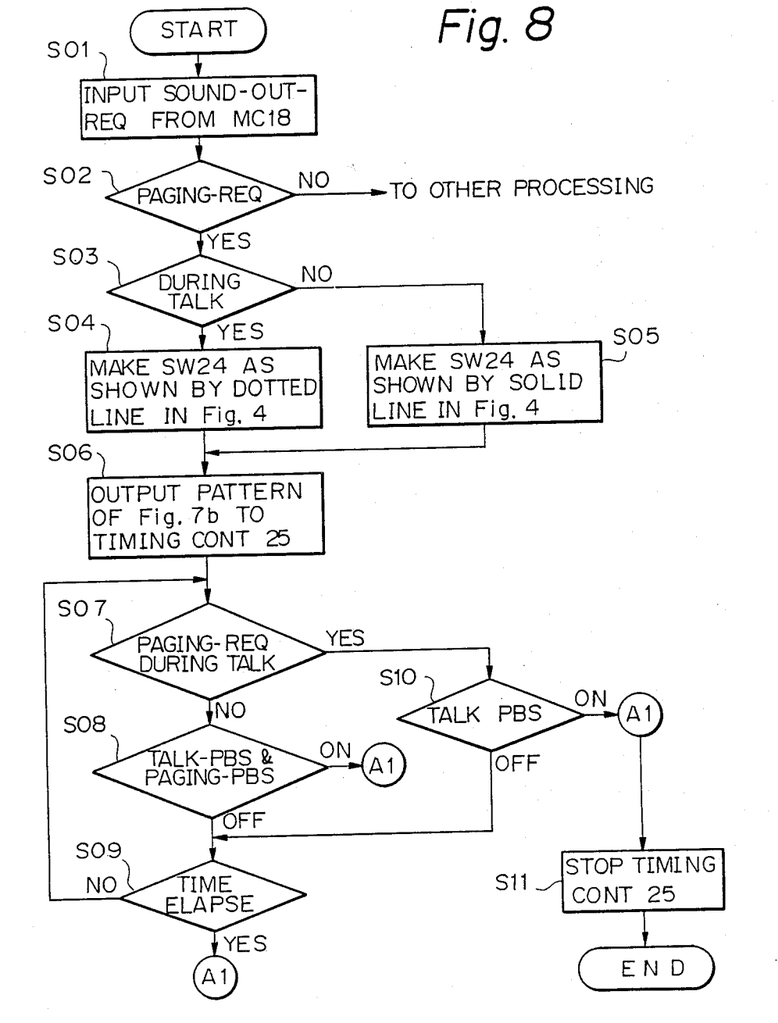
FIG. 8 is a flow chart explaining a control operation of a controller shown in FIG. 4.

The above sound generation operation will now be described in more detail with reference to FIG. 8. FIG. 8 shows the operation of the MPU portion 21 shown in FIG. 4 for processing the paging.

Step 01 (S01) in FIG. 8

The MPU portion 21 inputs a sound output request (or discrimination sound data) from the transmission and reception controller 18.

Step 02 (S02)

The MPU portion 21 detects a paging request from the input sound-output-request. If a paging request is not be detected, the MPU portion 21 processes other tasks generation thereof.

Steps 03 to 06 (S03 to S06)

The MPU portion 21 detects whether or not the hand set is in use for talking from the input sound-output-request. When not-talking, the MPU portion 21 deenergizes the switch 24 as shown by a dotted line in FIG. 4, supplying the 2 kHz signal to the sound generator 32. Otherwise, the MPU portion 21 energizes the switch 24 as shown by a solid line in FIG. 4, the supply the 1 kHz signal to the sound generator 32. Thereafter, the MPU portion 21 sends a sound output pattern, as shown in FIG. 7b, to the timing controller 25 and triggers the timing controller 25.

The low (70 dB) or high (91 dB) sound having pattern as shown in FIG. 7b is generated from the sound generator 32.

Steps 07 to 11 (S07 to S11)

The termination of the paging sound is carried out as follows:

a. When a paging request is made during talking (S07), the MPU portion 21
  (i) detects the "TALK PBS" or "PAGE PBS" operation (S08), or
  (ii) detects the request of the paging stop (S09), b. when a paging request is made during not talking (S07), the MPU portion 21
  (i) detects the "TALK PBS" operation (S10), or
  (ii) detects the elapse of a predetermined time (S09), and the MPU portion 21 stops the timing controller 25 (S11).

Other sound generation also can be carried out in a manner similar to the above.

As described above, various sounds of a combination of low or high sound levels and sound patterns can be generated. To generate those sounds, the external switch operation as shown in FIG. 1 is not required, and accordingly, the input and output ports of the microcomputers are not used for setting the sound generation, even if many more discrimination sounds are required. Thus the user does not have to carry out the sound setting operation. The sound generator 32 having the characteristic shown in FIG. 5, i.e., a sound pressure of 70 dB at a resonant frequency of approximately 1 kHz; of 92 dB at approximately 2 kHz; and, of 81 dB at approximately 4 kHz, can provide different sound levels by receiving different frequencies. The relationship of the resonant frequencies is 1:2:4, and thus the resonant frequency signals supplied to the sound generator can be easily produced by simple frequency dividers. In addition, the resonant frequencies of the sound generator are akin to the operation frequency of the microcomputers. This further makes it easy to produce signals by simple frequency dividers.

Referring to FIG. 4, by setting the first frequency divider 22b to output a divided signal of 4 kHz, and providing a third frequency divider (not shown) after the second frequency divider 23 and a second switch (not shown) connected between the third frequency divider and the timing controller 25, three different sound levels of approximately 70 dB, 85 dB, and 78 dB can be provided.

Figure 9:
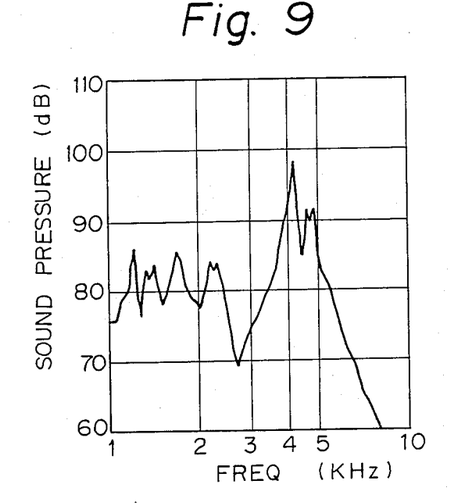
FIG. 9 is a graph representing another characteristic of another sound generator of FIG. 4; and, FIG. 10 is a block diagram of a discrimination sound generation circuit of the present invention.

FIG. 9 shows a characteristic curve of another magnetic sound generator, a B-12J made by CITIZEN ELECTRONIC CO., LTD. This sound generator generates a 78 dB sound at a frequency of 2 kHz and a 95 dB sound at a frequency of 4 kHz.

Other sound generators which have different sound pressures at different resonant frequencies, such as piezoelectric devices, can be applied in addition to the magnetic sound generators.

Figure 10:
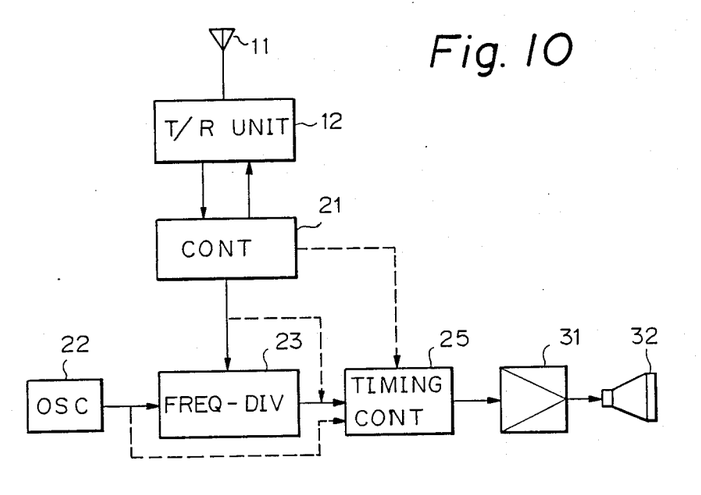

FIG. 10 is a block diagram of the circuits shown in FIG. 4. In FIG. 10, the circuit for generating the sound includes the antenna 11, a transmission and reception unit 12 including the base band portion, the MPU portion 21 consisting of the microcomputers, the oscillation circuit 22 consisting of the source clock oscillator 22a and the first frequency divider 22b providing the operation clock of the MPU portion 21 and the source resonant frequency of the sound generator, the frequency divider portion 23 including at least one frequency divider, the timing controller 25, the amplifier 31 and the sound generator 32 providing different sound pressures in response to different resonant frequencies.

The above circuit construction is simple, and thus, a compact unit having a power consumption can be provided at a low cost.

Many widely different embodiments of the present invention may be constructed without departing from the spirit and scope of the present invention. It should be understood that the present invention is not restricted to the specific embodiments above, except as defined in the appended claims.

I claim:

1. A portable cordless telephone set for outputting various types of discrimination sounds in radio communication with a base unit, and having a telephone transmission and reception portion comprising:

a sound generation control circuit operatively connected to said telephone transmission and reception portion to receive a discrimination sound request and having at least one microcomputer;

a clock generation circuit generating an operation clock signal of said sound generation control circuit;

a sound generator generating one of a plurality of discrimination sounds having sound pressures different from one another in response to one of a plurality of resonant frequencies different from one another supplied thereto, one of said resonant frequencies being near a frequency of the operation clock signal of the sound generation control circuit and output from the clock generation circuit, and other resonant frequencies being selected to satisfy the relationship of a ratio of an integer with respect to said one resonant frequency;

a frequency divider circuit operatively connected to the clock generation circuit to receive the clock signal and having at least one frequency divider dividing the clock signal and providing a divider frequency signal;

a switch circuit connected to the clock generation circuit and the frequency divider circuit to selectively output one frequency signal therefrom; and a timing control circuit operatively connected between the switch circuit and the sound generator, receiving the frequency signal from the switch circuit and outputting an ON/OFF timing signal of the received frequency signal to the sound generator in response to a command from the sound generation control circuit;

the sound generation control circuit energizing the switch circuit and sending the command to the timing control circuit in response to the received discrimination sound request.

2. A portable cordless telephone set according to claim 1, wherein said sound generator has at least two different resonant frequencies, the relationship of the resonant frequencies being approximately 1:n, where n is an integer, and outputs sound having different sound levels in response to the resonant frequencies.

3. A portable cordless telephone set according to claim 2, wherein said frequency divider circuit includes a frequency divider having a 1/n dividing function, and wherein said switch circuit includes a switch connected to the clock generation circuit and the frequency divider.

4. A portable cordless telephone set according to claim 3, wherein n is approximately two, and the frequency divider in the frequency divider circuit includes a delay type flip-flop.

5. A portable cordless telephone set according to claim 1, wherein said sound generator has at least three different resonant frequencies, the relationship of the resonant frequencies being approximately 1:n:2n, where n is an integer, and outputs sounds having different sound levels in response to the resonant frequencies.

6. A portable cordless telephone set according to claim 5, wherein said frequency divider circuit includes two series-connected frequency dividers, each having a 1/n dividing function, and a first frequency divider being connected to the clock generation circuit, and wherein said switch circuit includes two parallel switches, a first switch being connected to the clock generation circuit and the first frequency divider, and a second switch being connected to a second frequency divider.

7. A portable cordless telephone set according to claim 6, wherein n is approximately two, and each of the frequency dividers include a delay type flip-flop.

8. A portable cordless telephone set according to claim 1, wherein said sound generator comprises a magnetic sound generator.

9. A portable cordless telephone set according to claim 1, wherein said sound generator comprises a piezoelectronic device.

10. A portable cordless telephone set according to claim 1, further comprising an amplifier connected between the timing control circuit and the sound generator for amplifying the signal from the timing control circuit to a level at which the sound generator is driven.

* * * * *

UNITED STATES PATENT AND TRADEMARK OFFICE
CERTIFICATE OF CORRECTION

PATENT NO. : 4,884,294    Page 1 of 3
DATED : November 28, 1989
INVENTOR(S) : Fujio Inagami It is certified that error appears in the above-identified patent and that said Letters Patent is hereby corrected as shown below:

Column 1, line 22, change "sound and" to --sounds,--

Col. 1, line 23, change ", an" to --and an--.

Col. 2, line 9, change "1/n" to --1/$\underline{n}$--;

line 12, "n" should read --$\underline{n}$--.

line 17, change "1:n:2n" to

--1:$\underline{n}$:2$\underline{n}$--, and change

"n" to --$\underline{n}$--;

line 21, change "1/n" to --1/$\underline{n}$--;

line 27, change "n" to --$\underline{n}$--;

line 46, change "front" to --side--;

UNITED STATES PATENT AND TRADEMARK OFFICE
CERTIFICATE OF CORRECTION

PATENT NO. : 4,884,294           Page 2 of 3

DATED : November 28, 1989

INVENTOR(S) : Fujio Inagami

It is certified that error appears in the above-identified patent and that said Letters Patent is hereby corrected as shown below:

Col. 3, line 41, change "for" to --of-- and change "of" to --for--.

Col. 6, line 26, after "talking" insert --by--;

line 28, delete "by".

Col. 7, line 55, change "Thus" to --Thus,--;

Col. 9, line 18, change "1:n" to --1:$\underline{n}$--, and         and change "n" to --$\underline{n}$--;

line 23, change "1/n" to --1/$\underline{n}$--;

line 29, change "n" to --$\underline{n}$--.

UNITED STATES PATENT AND TRADEMARK OFFICE
CERTIFICATE OF CORRECTION

PATENT NO. : 4,884,294
DATED : November 28, 1989
INVENTOR(S) : Fujio Inagami It is certified that error appears in the above-identified patent and that said Letters Patent is hereby corrected as shown below:

Col. 10, line 4, change "1:n:2n" to --1:$\underline{n}$:2$\underline{n}$--;

line 5, change "n" to --$\underline{n}$--;

line 10, change "1/n" to --1/$\underline{n}$--;

line 18, change "n" to --$\underline{n}$--;

line 19, change "include" to

--includes--.

Title page, item [54], line 3, and col. 1, line 2,
change "DISCRIMINIATION" to --DISCRIMINATION--.

Signed and Sealed this

Eleventh Day of May, 1993

*Attest:*

MICHAEL K. KIRK

*Attesting Officer*     Acting Commissioner of Patents and Trademarks